(12) United States Patent
Shinoda et al.

(10) Patent No.: US 12,482,241 B2
(45) Date of Patent: Nov. 25, 2025

(54) MACHINE LEARNING DEVICE AND RECORDING MEDIUM

(71) Applicant: TOYOTA JIDOSHA KABUSHIKI KAISHA, Toyota (JP)

(72) Inventors: Yoshihisa Shinoda, Sunto-gun Shizuoka-ken (JP); Shigeki Nakayama, Gotemba (JP); Koji Ide, Gotemba (JP); Tomohiro Kaneko, Mishima (JP); Hiroshi Oyagi, Kyoto (JP); Masaki Ito, Toyota (JP); Yuki Takahashi, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 18/203,963

(22) Filed: May 31, 2023

(65) Prior Publication Data
US 2023/0410485 A1 Dec. 21, 2023

(30) Foreign Application Priority Data
Jun. 20, 2022 (JP) .................. 2022-099100

(51) Int. Cl.
*G06V 10/776* (2022.01)
*G06V 40/10* (2022.01)

(52) U.S. Cl.
CPC ............ *G06V 10/776* (2022.01); *G06V 40/10* (2022.01)

(58) Field of Classification Search
CPC .... G06V 10/776; G06V 40/10; G06V 10/764; G06V 10/774; G06V 10/70; G06V 10/778; G06V 10/95
See application file for complete search history.

(56) References Cited

U.S. PATENT DOCUMENTS
2020/0257897 A1 8/2020 Ogura

FOREIGN PATENT DOCUMENTS
JP 2019-164666 A 9/2019

OTHER PUBLICATIONS

"Alexander Loos et al., Identification of Great Apes Using Face Recognition, Apr. 2015, 2011 19th European Signal Processing Conference" (Year: 2011).*
"Dave Tahmoush et. al., Remote Detection of Humans and Animals, Oct. 2009, 2009 IEEE Applied Imagery Pattern Recognition Workshop (AIPR 2009), Washington, DC, USA" (Year: 2009).*
"Alex Hern, Google's Solution to Accidental Algorithmic Racism: Ban Gorillas, Jan. 2018, theguardian.com" (Year: 2018).*
"Lisa A. Parr et. al., The Importance of Surface-Based Cues for Face Discrimination in Non-Human Primates, Dec. 2010, Proc. R. Soc. B 278, 1964-1972" (Year: 2010).*

* cited by examiner

*Primary Examiner* — Chineyere Wills-Burns
*Assistant Examiner* — Phuong Hau Cai
(74) *Attorney, Agent, or Firm* — Dinsmore & Shohl LLP

(57) ABSTRACT

A machine learning device includes a processor which performs, when performing learning of a model with image data, the learning of the model while excluding the image data of an animal having a feature amount common with a feature amount of a human.

6 Claims, 2 Drawing Sheets

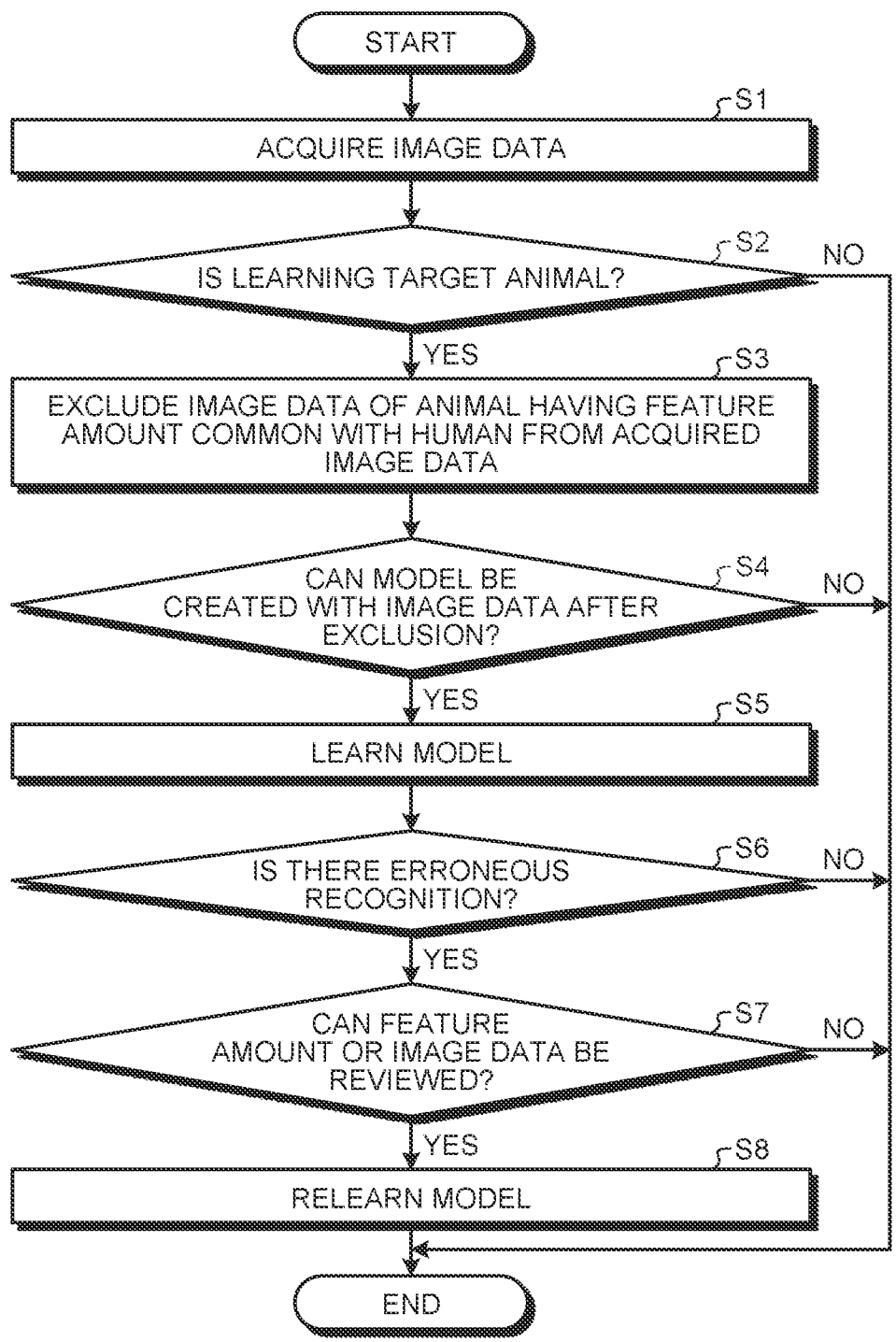

MACHINE LEARNING DEVICE AND RECORDING MEDIUM

CROSS-REFERENCE TO RELATED APPLICATION(S)

The present application claims priority to and incorporates by reference the entire contents of Japanese Patent Application No. 2022-099100 filed in Japan on Jun. 20, 2022.

BACKGROUND

The present disclosure relates to a machine learning device and a recording medium.

Japanese Laid-open Patent Publication No. 2019-164666 discloses a technology capable of accurately detecting a human or an animal from an image in a case where a front or back of the human or the animal is captured on the image.

SUMMARY

There is a need for providing a machine learning device and a recording medium storing a machine learning program that are capable of creating a highly accurate learned model and that do not erroneously recognize an animal as a human.

According to an embodiment, a machine learning device includes a processor. Further, the processor performs, when performing learning of a model with image data, the learning of the model while excluding the image data of an animal having a feature amount common with a feature amount of a human.

According to an embodiment, a non-transitory computer-readable recording medium stores a machine learning program for causing a processor to execute learning, when learning a model with image data, the model while excluding the image data of an animal having a feature amount common with a feature amount of a human.

BRIEF DESCRIPTION OF THE DRAWINGS

FIG. 3 is a flowchart illustrating an example of a processing procedure of a machine learning method executed by the machine learning device according to the embodiment.

DETAILED DESCRIPTION

In Japanese Laid-open Patent Publication No. 2019-164666, for example, a learned model is created by machine learning, and a human or an animal is detected from an image by utilization of the learned model. However, there is a case where an animal is erroneously recognized as a human. Thus, there is a demand for a technology capable of creating a highly accurate learned model that does not erroneously recognize an animal as a human.

A machine learning device and a machine learning program stored in a recording medium according to an embodiment of the present disclosure will be described with reference to the drawings. Note that components in the following embodiment include what can be easily replaced by those skilled in the art or what is substantially the same.

Machine Learning System

Figure 1:
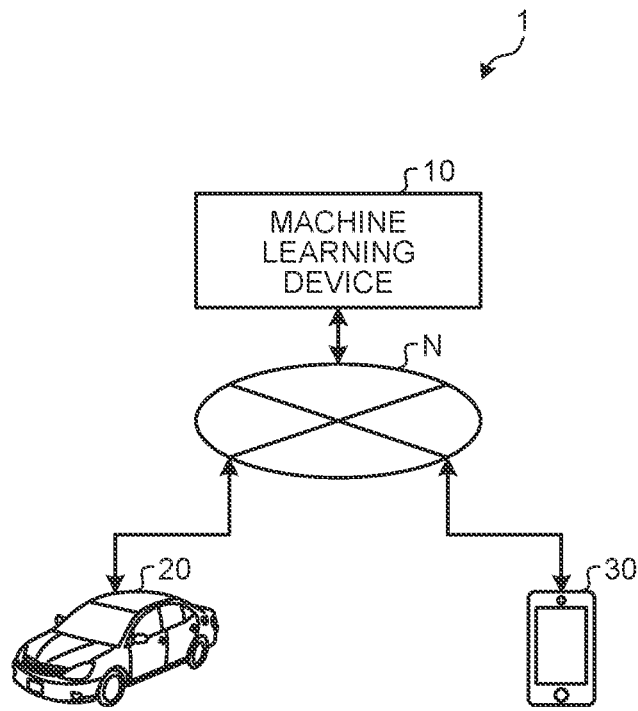
FIG. 1 is a view illustrating a schematic configuration of a machine learning system according to an embodiment.

A machine learning system according to the embodiment will be described with reference to FIG. 1 and FIG. 2. As illustrated in FIG. 1, a machine learning system 1 includes a machine learning device 10, a vehicle 20, and a mobile terminal device 30. All of the machine learning device 10, the vehicle 20, and the mobile terminal device 30 have respective communication functions, and can communicate with each other through a network N. This network N includes, for example, the Internet network, a mobile phone network, and the like.

Machine Learning Device

The machine learning device 10 creates a machine learning model (hereinafter, may be simply referred to as a "model") by using image data collected by the vehicle 20 and the mobile terminal device 30. This machine learning device 10 is realized by a general-purpose computer such as a workstation or a personal computer. Furthermore, the machine learning device 10 may be mounted on a cloud.

The machine learning system 1 using the machine learning device 10 collects habitat information of an animal by photographing the animal with, for example, an in-vehicle camera of the vehicle 20 or a camera of the mobile terminal device 30. Then, on the basis of the collected habitat information of the animal, a current trend of the animal is grasped, and prediction of a future trend and habitat information of the animal, or the like is performed. Note that an "animal" indicates an animal excluding a human in the present embodiment.

Figure 2:
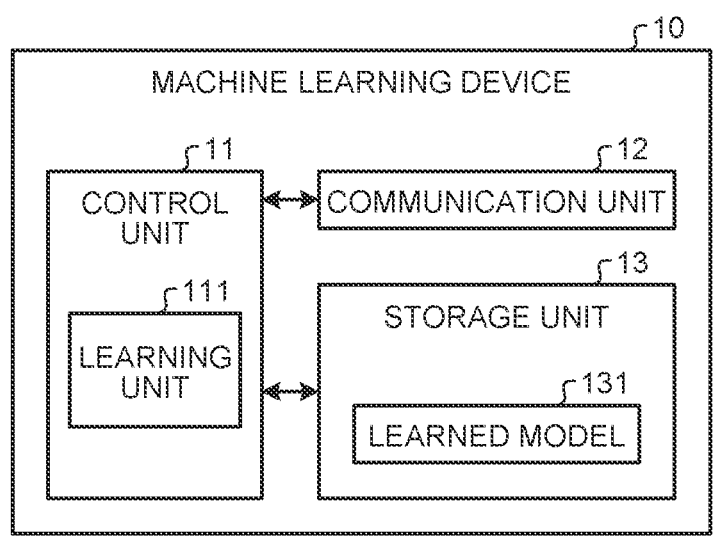
FIG. 2 is a block diagram illustrating a schematic configuration of a machine learning device according to the embodiment.

As illustrated in FIG. 2, the machine learning device 10 includes a control unit 11, a communication unit 12, and a storage unit 13. More specifically, the control unit 11 includes a processor including a central processing unit (CPU), a digital signal processor (DSP), a field-programmable gate array (FPGA), a graphics processing unit (GPU), and the like, and a memory (main storage unit) including a random access memory (RAM), a read only memory (ROM), and the like.

The control unit 11 realizes a function that meets a predetermined purpose by loading and executing a program, which is stored in the storage unit 13, in a work area of the main storage unit and controlling each configuration unit and the like through execution of the program. The control unit 11 functions as a learning unit 111 through execution of the program stored in the storage unit 13.

The learning unit 111 creates a model (learned model) by learning image data, which is acquired from the vehicle 20 and the mobile terminal device 30, by using a machine learning technology. The learning method used by the learning unit 111 is not specifically limited, and, for example, various machine learning technologies such as deep learning using a neural network, a support vector machine, a decision tree, simple Bayes, and k-nearest neighbor algorithm can be used.

When learning the model by using the image data acquired from the vehicle 20 and the mobile terminal device 30, the learning unit 111 excludes image data of an animal having a feature amount common with a feature amount of a human from the image data. Then, the learning unit 111 learns the model by using only the image data of animals having no feature amount common with a feature amount of a human.

Here, the "feature amount common with the feature amount of the human" is a parameter that characterizes the human when an image of the human and an image of an animal other than the human are compared, and examples thereof include "standing on two legs", "having a small hair area", and "being clothed", and the like.

The "feature amount common with the feature amount of the human" is determined in advance (for each animal) according to a kind of the animal. For example, since a bear "stands on two legs/has a large body size", a standing posture and a body size thereof are in common with, for example, a tall adult human. Thus, the feature amount common between the bear and the human (tall adult) is "standing on two legs/having a large body size". In addition, for example, since a wild boar "stands on four legs/has a small body size", a standing posture and a body size thereof are in common with those of a human child who crawls in a four-legged manner. Thus, the feature amount common between the wild boar and the human (child) is "standing on four legs/having a small body size". As described above, the "feature amount common with the feature amount of the human" is determined based on to a kind (type) of an animal.

For example, in a case of learning image data in which a bear is captured, the learning unit 111 excludes image data in which a bear that "stands on two legs/has a large body size" and that is likely to be erroneously recognized as a tall adult human is captured, and learns the model. Furthermore, for example, in a case of learning image data in which a wild boar is captured, the learning unit 111 excludes image data in which a wild boar that "stands on four legs/has a small body size" and that is likely to be erroneously recognized as a human child who crawls in a four-legged manner is captured, and learns the model. Note that the learning unit 111 may previously perform necessary preprocessing or the like on the image data for learning when learning the model.

In a case where the created model is a model that erroneously recognizes an animal as a human, the learning unit 111 may perform relearning under a predetermined condition. In this case, the learning unit 111 first determines presence or absence of erroneous recognition in the created model, and changes or adds the "feature amount common with a feature amount of the human" in a case of determining that there is the erroneous recognition.

For example, it is assumed that a learning target is a "bear" and a predetermined "feature amount common with a feature amount of a human" is "standing on two legs/having a large body size". In this case, for example, when image data of a short adult human is input as input data of the created model, there is a possibility that the input image is erroneously recognized as a bear.

Thus, in a case where such erroneous recognition is generated, the learning unit 111 changes the "feature amount common with the feature amount of the human" to "standing on two legs/having a small body size", or adds "standing on two legs/having a small body size" as the "feature amount common with the feature amount of the human". Then, with respect to the image data (learning data) that is the same as that of the previous time, the learning unit 111 excludes image data of the changed or added feature amount and performs relearning of the model. Note that in a case where erroneous recognition is also generated in the relearned model, the learning unit 111 performs relearning while changing or adding the "feature amount common with the feature amount of the human" until the erroneous recognition becomes no longer generated. As described above, it is possible to create a highly accurate model with less erroneous recognition by performing relearning while changing or adding the "feature amount common with the feature amount of the human".

Furthermore, the learning unit 111 may determine presence or absence of the erroneous recognition in the created model, change the image data used for learning to another piece of image data in a case of determining that there is the erroneous recognition, and perform relearning of the model by using the image data after the change. Note that in a case where erroneous recognition is also generated in the relearned model, the learning unit 111 performs the relearning while changing the image data until the erroneous recognition becomes no longer generated. In such manner, by performing the relearning while changing the image data, it is possible to create a highly accurate model with less erroneous recognition.

The communication unit 12 includes, for example, a communication module or the like capable of transmitting and receiving various kinds of information. The communication unit 12 communicates with the vehicle 20, the mobile terminal device 30, and the like through the network N, and transmits and receives various kinds of information.

The storage unit 13 is realized, for example, by recording media such as an erasable programmable ROM (EPROM), a hard disk drive (HDD), and a removable medium. Examples of the removable media include a universal serial bus (USB) memory, and disc recording media such as a compact disc (CD), a digital versatile disc (DVD), and a Blu-ray (registered trademark) disc (BD).

The storage unit 13 can store an operating system (OS), various programs, various tables, various databases, and the like. In addition, a learned model 131 is stored in the storage unit 13. In addition to the learned model 131, the storage unit 13 may store a processing result in the control unit 11, image data (learning data) acquired from the vehicle 20 and the mobile terminal device 30, and the like as necessary.

The learned model 131 is a model on which learning or relearning is performed by the learning unit 111. The learning method of the learned model 131 is not specifically limited, and, for example, various machine learning technologies such as deep learning using a neural network, a support vector machine, a decision tree, simple Bayes, and k-nearest neighbor algorithm can be used.

Vehicle

The vehicle 20 collects image data. Examples of the vehicle 20 include a general gasoline vehicle, a hybrid electric vehicle (HEV), a plug-in hybrid electric vehicle (PHEV), a fuel cell electric vehicle (FCEV), a battery electric vehicle (BEV), and the like. In addition, the vehicle 20 may be a manually driven vehicle or an automatically driven vehicle.

Furthermore, the vehicle 20 includes, for example, an in-vehicle camera and a communication function such as a data communication module (DCM). The vehicle 20 captures an image of a periphery including an animal by the in-vehicle camera, and transmits the captured image data to the machine learning device 10 through the network N.

Mobile Terminal Device

Similarly to the vehicle 20, the mobile terminal device 30 collects image data. Examples of the mobile terminal device 30 include a mobile phone, a smartphone, and a tablet terminal device.

Furthermore, the mobile terminal device 30 includes, for example, a camera, and a communication function such as a communication module. The mobile terminal device 30 captures an image of a periphery including an animal by the camera, and transmits the captured image data to the machine learning device 10 through the network N.

Machine Learning Method

An example of a processing procedure of the machine learning method executed by the machine learning device according to the embodiment will be described with reference to FIG. 3.

First, the learning unit 111 acquires image data from the vehicle 20 and the mobile terminal device 30 (Step S1). Subsequently, the learning unit 111 determines whether a learning target is an animal other than a human (Step S2).

In a case of determining that the learning target is an animal (Yes in Step S2), the learning unit 111 excludes image data of an animal having a feature amount common with a feature amount of a human from the acquired image data (Step S3). Subsequently, the learning unit 111 determines whether a model can be created with the image data after the exclusion (Step S4). The determination in Step S4 can be made on the basis of, for example, whether there is the sufficient number of pieces of image data for the model creation.

In a case of determining that the model can be created with the image data after the exclusion (Yes in Step S4), the learning unit 111 learns the model by using the image model (Step S5). Subsequently, the learning unit 111 inputs a test image prepared in advance to the learned model and determines presence or absence of erroneous recognition (Step S6).

In a case of determining that there is the erroneous recognition (Yes in Step S6), the learning unit 111 determines whether the feature amount common with the feature amount of the human or the image data can be reviewed (Step S7). The determination in Step S7 can be made on the basis of whether there is another feature amount common with the feature amount of the human and whether there is changeable image data.

In a case of determining that the feature amount or the image data can be reviewed (Yes in Step S7), the learning unit 111 performs relearning of the model by using the changed feature amount or image data (Step S8) and completes the present processing. Note that the present processing is also completed in a case where negative determination is made in Step S2, S4, S6, or S7.

In the machine learning device and the machine learning program stored in the recording medium according to the embodiment described above, since the model learning is performed while the image data of the animal having the feature amount common with the feature amount of the human is excluded, a possibility that the animal is erroneously recognized as the human is reduced. Thus, according to the machine learning device and the machine learning program stored in the recording medium of the embodiment, it is possible to create a highly accurate learned model that does not erroneously recognize an animal as a human.

Further effects and modification examples can be easily derived by those skilled in the art. Accordingly, broader aspects of the present disclosure are not limited by the specific details and representative embodiments that are illustrated and described in the above manner. Thus, various modifications can be made without departing from the sprit or scope of a general concept of the disclosure defined by the accompanying claims and an equivalent thereof.

For example, although the vehicle 20 and the mobile terminal device 30 have been described as examples of subjects that collect image data in the present embodiment, the image data may be collected by utilization of only one of the vehicle 20 or the mobile terminal device 30. Alternatively, image data may be collected by a device other than the vehicle 20 and the mobile terminal device 30. Furthermore, an example in which the image data is directly transferred from the vehicle 20 and the mobile terminal device 30 to the machine learning device 10 has been described in the present embodiment. However, the image data may be temporarily accumulated in a predetermined device from the vehicle 20 and the mobile terminal device 30, and the image data may be transferred from this device to the machine learning device 10.

In addition, although an example in which learning and relearning of a model are performed by the machine learning device 10 has been described in the present embodiment, learning and relearning of a model may be performed on a side of the vehicle 20 or the mobile terminal device 30 that collects image data.

Furthermore, although a case of creating a model that does not erroneously recognize an animal as a human has been described in the present embodiment, application to a case of creating a "model that does not erroneously recognize a human as an animal" is also possible. In this case, when learning a model by using image data acquired from the vehicle 20 and the mobile terminal device 30, the learning unit 111 excludes image data of a human having a feature amount common with a feature amount of an animal from the image data. Then, the learning unit 111 learns the model by using only image data of a human having no feature amount common with the feature amount of the animal.

As described above, a model is learned with image data of a human having a feature amount common with the feature amount of an animal being excluded, whereby a possibility of erroneously recognizing a human as an animal is reduced. Thus, it is possible to create a highly accurate learned model that does not erroneously recognize a human as an animal.

According to the present disclosure, it is possible to create a highly accurate learned model that does not erroneously recognize an animal as a human.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A machine learning system comprising:
   a machine learning device;
   a vehicle having an in-vehicle camera, the vehicle in communication with the machine learning device via a network; and
   a mobile terminal device having a camera, the mobile terminal device in communication with the vehicle and the machine learning device via the network, wherein the in-vehicle camera or the camera is configured to capture image data and the vehicle or the mobile terminal device, respectively, is configured to transmit the image data to the machine learning device, the machine learning device comprising:
   a memory configured for storing instructions; and
   a processor configured to:
      acquire the image data;
      determine whether a learning target in the image data is an animal;
      in response to the determination that the learning target is the animal, exclude from the image data the animal when the animal has a feature amount common with a feature amount of a human, the feature amount common with the feature amount of the human is stored in advance according to a kind of the animal;

determine whether a model can be created with the image data after the exclusion from the image data of the animal, the determination of whether the model can be created is based on whether a predetermined number of pieces of image data remain after the exclusion for model creation; and learn the model with the image data using only image data of a human having no feature amount common with the feature amount of the animal.

2. The machine learning system of claim 1, wherein the processor is configured to:

determine presence or absence of erroneous recognition in a created model, and change the feature amount common with the feature amount of the human or changes the image data to be used for the learning, and performs relearning of the model, in a case of determining that there is the erroneous recognition.

3. The machine learning system of claim 1, wherein:
the feature amount common with the feature amount of the human is determined based on a kind of the animal.

4. A non-transitory computer-readable recording medium storing a machine learning program for causing a processor to execute;

acquiring image data captured from an in-vehicle camera of a vehicle in communication with the processor via a network or captured from a camera of a mobile terminal device in communication with the processor;

determining whether a learning target is an animal;

in response to the determination that the learning target is the animal, excluding from the image data the animal when the animal has a feature amount common with a feature amount of a human, the feature amount common with the feature amount of the human is stored in advance according to a kind of the animal;

determine whether a model can be created with the image data after the exclusion from the image data of the animal, the determination of whether the model can be created is based on whether a predetermined number of pieces of image data remain after the exclusion for model creation; and learning the model with the image data using only image data of a human having no feature amount common with the feature amount of the animal.

5. The non-transitory computer-readable recording medium storing the machine learning program according to claim 4, the program causing the processor to execute determining presence or absence of erroneous recognition in a created model, and changing the feature amount common with the feature amount of the human or changing the image data to be used for the learning, and performing relearning of the model in a case of determining that there is the erroneous recognition.

6. The non-transitory computer-readable recording medium storing the machine learning program according to claim 4, wherein the feature amount common with the feature amount the human is determined based on a kind of the animal.

* * * * *